(12) United States Patent
Tsai

(10) Patent No.: US 11,306,883 B2
(45) Date of Patent: Apr. 19, 2022

(54) LIGHTING CONTROLLER AND METHOD OF SWITCHING LIGHT STRING BETWEEN PLURALITY OF LIGHTING MODES, AND LIGHT STRING ASSEMBLY

(71) Applicant: Cosmo Lighting Inc., Walnut, CA (US)

(72) Inventor: Nai-Chen Tsai, New Taipei (TW)

(73) Assignee: Cosmo Lighting Inc., Walnut, CA (US)

( * ) Notice: Subject to any disclaimer, the term of this patent is extended or adjusted under 35 U.S.C. 154(b) by 224 days.

(21) Appl. No.: 16/877,501

(22) Filed: May 19, 2020

(65) Prior Publication Data

US 2021/0262629 A1    Aug. 26, 2021

(30) Foreign Application Priority Data

Feb. 26, 2020    (TW) ................. 109106283

(51) Int. Cl.
| | |
|---|---|
| *F21S 4/24* | (2016.01) |
| *F21V 23/00* | (2015.01) |
| *H05B 45/40* | (2020.01) |
| *F21S 4/10* | (2016.01) |
| *H05B 47/17* | (2020.01) |

(Continued)

(52) U.S. Cl.
CPC . *F21S 4/24* (2016.01); *F21S 4/10* (2016.01); *F21S 9/02* (2013.01); *F21S 10/023* (2013.01); *F21V 23/001* (2013.01); *F21V 23/008* (2013.01); *F21V 23/04* (2013.01); *H05B 45/40* (2020.01); *H05B 47/16* (2020.01);
(Continued)

(58) Field of Classification Search
CPC ........ F21S 4/24; F21S 4/10; F21S 9/02; F21S 10/023; F21S 4/26; F21V 23/001; F21V 23/008; F21V 23/04; H05B 45/40; H05B 47/17; H05B 47/175–195; H05B 47/155–16; F21W 2121/04; F21Y 2115/10; Y02B 20/40
See application file for complete search history.

(56) References Cited

U.S. PATENT DOCUMENTS

| 2017/0136259 A1* | 5/2017 | Ueno ..................... H05B 47/16 |
| 2018/0049298 A1* | 2/2018 | Benoit ................ H05B 47/155 |

(Continued)

FOREIGN PATENT DOCUMENTS

WO    WO-2018071047 A1 *    4/2018    ............ F21S 10/023

*Primary Examiner* — Renan Luque
(74) *Attorney, Agent, or Firm* — Li & Cai Intellectual Property Office

(57) ABSTRACT

A lighting controller and a method of switching a light string between a plurality of lighting modes, and a light string assembly are provided. The lighting controller includes a control box, a switch power source circuit, and a lighting control circuit. A switching component is disposed on the control box. The switch power source circuit and the lighting control circuit are accommodated in the control box. The switch power source circuit is triggered to allow a power supply component to supply power to the light string during a predetermined time by the switching component receiving a turning-on timing trigger and allows the switching component to receive a plurality of lighting triggers. The lighting control circuit switches the light string between the plurality of lighting modes to exhibit a variable lighting effect according to the plurality of lighting triggers.

23 Claims, 6 Drawing Sheets

(51) Int. Cl.
 *H05B 47/16* (2020.01)
 *F21S 9/02* (2006.01)
 *F21S 10/02* (2006.01)
 *F21V 23/04* (2006.01)
 *F21Y 115/10* (2016.01)
 *F21W 121/04* (2006.01)

(52) U.S. Cl.
 CPC ......... *H05B 47/17* (2020.01); *F21W 2121/04* (2013.01); *F21Y 2115/10* (2016.08)

(56) References Cited

U.S. PATENT DOCUMENTS

2018/0206300 A1\* 7/2018 Farnsworth ............ H05B 47/19
2019/0082522 A1\* 3/2019 Conway ............... H03K 17/296

\* cited by examiner

_(1)_

LIGHTING CONTROLLER AND METHOD OF SWITCHING LIGHT STRING BETWEEN PLURALITY OF LIGHTING MODES, AND LIGHT STRING ASSEMBLY

CROSS-REFERENCE TO RELATED PATENT APPLICATION

This application claims the benefit of priority to Taiwan Patent Application No. 109106283, filed on Feb. 26, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light string, and more particularly to a lighting controller and a method of switching a light string between a plurality of lighting modes, and a light string assembly.

BACKGROUND OF THE DISCLOSURE

Light strings are often used for decoration during the Christmas season. They are most often wound around a Christmas tree to enhance a festive atmosphere. However, traditional light strings can only produce a monotonous lighting effect on the Christmas tree, and lack a capacity for variety through special designs. In recent years, with higher demands toward an improved quality of life, light strings are required that exhibit variable lighting effects.

SUMMARY OF THE DISCLOSURE

According to the above-referenced technical inadequacies, the present disclosure provides a lighting controller for switching a light string between a plurality of lighting modes. The lighting controller includes a control box, a switch power source circuit and a lighting control circuit. A switching component is disposed on the control box. The switch power source circuit is accommodated in the control box. The switch power source circuit is connected to the light string and disposed adjacent to the switching component. When the switching component receives a turning-on timing trigger, the switch power source circuit is triggered to allow a power supply component to supply power to the light string during a predetermined time by the switching component. The lighting control circuit is accommodated in the control box. The lighting control circuit is connected to the light string and the switch power source circuit, and disposed adjacent to the switching component. When the light string receives the power, the lighting control circuit allows the switching component to receive a plurality of lighting triggers. When the switching component receives the plurality of lighting triggers, the switching component triggers the lighting control circuit to switch the light string between the plurality of lighting modes according to the plurality of lighting triggers to control the light string to exhibit a variable lighting effect.

In certain embodiments, the control box has a power source accommodation space, in which the power supply component including one or more batteries is accommodated. The control box has a circuit accommodation space, in which the switch power source circuit and the lighting control circuit are accommodated.

In certain embodiments, the switching component includes a switch button and a mode switching button. The switch button receives the turning-on timing trigger. The mode switching button receives the plurality of lighting triggers.

In certain embodiments, when the switch button receives a turning-off trigger, the switch power source circuit stops the power supply component from supplying the power to the light string.

In certain embodiments, when the switch button receives a cancel timing trigger, the lighting control circuit controls the power supply component to continuously supply the power.

In certain embodiments, the light string is switched between the plurality of lighting modes according to the number of times of triggering the mode switching button.

In certain embodiments, a plurality of lighting patterns and a plurality of sequence numbers are marked on the control box. The lighting patterns respectively correspond to the sequence numbers. Each sequence number represents the number of times that the mode switching button needs to be triggered.

In certain embodiments, the plurality of lighting modes includes a steady white light mode, a steady multicolor light mode, a flash white light mode, a flash multicolor light mode, a fade white light mode, a fade multicolor light mode, a flash white-multicolor light alternating mode, a fade white-multicolor light alternating mode. The light string emits a steady white light in the steady white light mode. The light string emits a steady multicolor light in the steady multicolor light mode. The light string emits a flash white light in the flash white light mode. The light string emits a flash multicolor light in the flash multicolor light mode. The light string initially emits a white light having an initial white brightness, which gradually decreases to a gray value as time progresses and then changes back to the initial white brightness, in the fade white light mode. The light string initially emits a multicolor light having an initial multicolor brightness, which gradually decreases to a gray value as time progresses and then changes back to the initial multicolor brightness, in the fade multicolor light mode. The light string alternatingly emits a white light and a multicolor light in the flash white-multicolor light alternating mode. The light string emits a light, which initially has a first gray value, then gradually changes to a preset white light brightness, then gradually changes to a second gray value, and then gradually changes to a preset multicolor light brightness, in the fade white-multicolor light alternating mode.

In certain embodiments, a plurality of light-emitting components are disposed in the light string, and each light-emitting component has multiple chips, which emit lights having the same color or different colors.

In addition, the present disclosure provides a light string assembly having a plurality of lighting modes. The light string assembly includes a light string and a lighting control circuit. The lighting controller includes lighting controller, a switch power source circuit and a lighting control circuit. A switching component is disposed on the control box. The switch power source circuit is accommodated in the control box. The switch power source circuit is connected to the light string and disposed adjacent to the switching component. When the switching component receives a turning-on timing trigger, the switch power source circuit is triggered to allow a power supply component to supply power to the light string during a predetermined time by the switching component. The lighting control circuit is accommodated in the control box. The lighting control circuit is connected to the light string and the switch power source circuit, and disposed adjacent to the switching component. When the light string receives the power, the lighting control circuit allows the switching component to receive a plurality of lighting triggers. When the switching component receives the plurality of lighting triggers, the switching component triggers the lighting control circuit to switch the light string between the plurality of lighting modes according to the plurality of lighting triggers to control the light string to exhibit a variable lighting effect.

In certain embodiments, the control box has a power source accommodation space, in which the power supply component including one or more batteries is accommodated. The control box has a circuit accommodation space, in which the switch power source circuit and the lighting control circuit are accommodated.

In certain embodiments, the switching component includes a switch button and a mode switching button. The switch button receives the turning-on timing trigger. The mode switching button receives the plurality of lighting triggers.

In certain embodiments, when the switch button receives a turning-off trigger, the switch power source circuit stops the power supply component from supplying the power to the light string.

In certain embodiments, when the switch button receives a cancel timing trigger, the lighting control circuit controls the power supply component to continuously supply the power.

In certain embodiments, the light string is switched between the plurality of lighting modes according to the number of times of triggering the mode switching button.

In certain embodiments, a plurality of lighting patterns and a plurality of sequence numbers are marked on the control box. The lighting patterns respectively correspond to the sequence numbers. Each sequence number represents the number of times that the mode switching button needs to be triggered.

In certain embodiments, the plurality of lighting modes includes a steady white light mode, a steady multicolor light mode, a flash white light mode, a flash multicolor light mode, a fade white light mode, a fade multicolor light mode, a flash white-multicolor light alternating mode, a fade white-multicolor light alternating mode. The light string emits a steady white light in the steady white light mode. The light string emits a steady multicolor light in the steady multicolor light mode. The light string emits a flash white light in the flash white light mode. The light string emits a flash multicolor light in the flash multicolor light mode. The light string initially emits a white light having an initial white brightness, which gradually decreases to a gray value as time progresses and then changes back to the initial white brightness, in the fade white light mode. The light string initially emits a multicolor light having an initial multicolor brightness, which gradually decreases to a gray value as time progresses and then changes back to the initial multicolor brightness, in the fade multicolor light mode. The light string alternatingly emits a white light and a multicolor light in the flash white-multicolor light alternating mode. The light string emits a light, which initially has a first gray value, then gradually changes to a preset white light brightness, then gradually changes to a second gray value, and then gradually changes to a preset multicolor light brightness, in the fade white-multicolor light alternating mode.

In certain embodiments, a plurality of light-emitting components are disposed in the light string, and each light-emitting component has multiple chips, which emit lights having the same color or different colors.

In addition, the present disclosure provides a method of switching a light string between a plurality of lighting modes. The method includes the following steps: applying a turning-on timing trigger to a switching component on a control box; triggering a switch power source circuit to allow a power supply component to supply power to the light string during a predetermined time according to the turning-on timing trigger being received by the switching component; applying a plurality of lighting triggers to the switching component; and triggering a lighting control circuit to switch the light string between the plurality of lighting modes to control the light string to exhibit a variable lighting effect according to the lighting triggers received by the switching component.

In certain embodiments, the method further includes the following steps: receiving a turning-off trigger by a switch button of the switching component; and stopping the power supply component supplying the power to the light string according to the turning-off trigger by the switch power source circuit.

In certain embodiments, the method further includes the following steps: receiving a cancel timing trigger by a switch button of the switching component; and controlling the power supply component to continuously supply the power according to the cancel timing trigger by the lighting control circuit.

In certain embodiments, the method further includes the following steps: providing a steady white light mode, a steady multicolor light mode, a flash white light mode, a flash multicolor light mode, a fade white light mode, a fade multicolor light mode, a flash white-multicolor light alternating mode and a fade white-multicolor light alternating mode, which are included in the plurality of lighting modes. The light string emits a steady white light in the steady white light mode. The light string emits a steady multicolor light in the steady multicolor light mode. The light string emits a flash white light in the flash white light mode. The light string emits a flash multicolor light in the flash multicolor light mode. The light string initially emits a white light having an initial white brightness, which gradually decreases to a gray value as time progresses and then changes back to the initial white brightness, in the fade white light mode. The light string initially emits a multicolor light having an initial multicolor brightness, which gradually decreases to a gray value as time progresses and then changes back to the initial multicolor brightness, in the fade multicolor light mode. The light string alternatingly emits a white light and a multicolor light in the flash white-multicolor light alternating mode. The light string emits a light, which initially has a first gray value, then gradually changes to a preset white light brightness, then gradually changes to a second gray value, and then gradually changes to a preset multicolor light brightness, in the fade white-multicolor light alternating mode.

In certain embodiments, the method further includes the following steps: disposing a plurality of light-emitting components each having multiple chips in the light string; and emitting lights having the same color or different colors by the multiple chips of each light-emitting component.

As described above, the present disclosure provides the lighting controller and the method of switching the light string between the plurality of lighting modes, and the light string assembly. The plurality of lighting patterns and the plurality of sequence numbers are marked on the control box of the light string and correspond to the plurality of lighting modes. The sequence numbers instruct the number of times that the switching components such as two buttons on the control box need to be switched. The lighting controller switches the light string between the plurality of lighting modes according to the number of times of triggering the switching components. Therefore, the light string can exhibit the variable lighting effect to provide a better decorative effect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
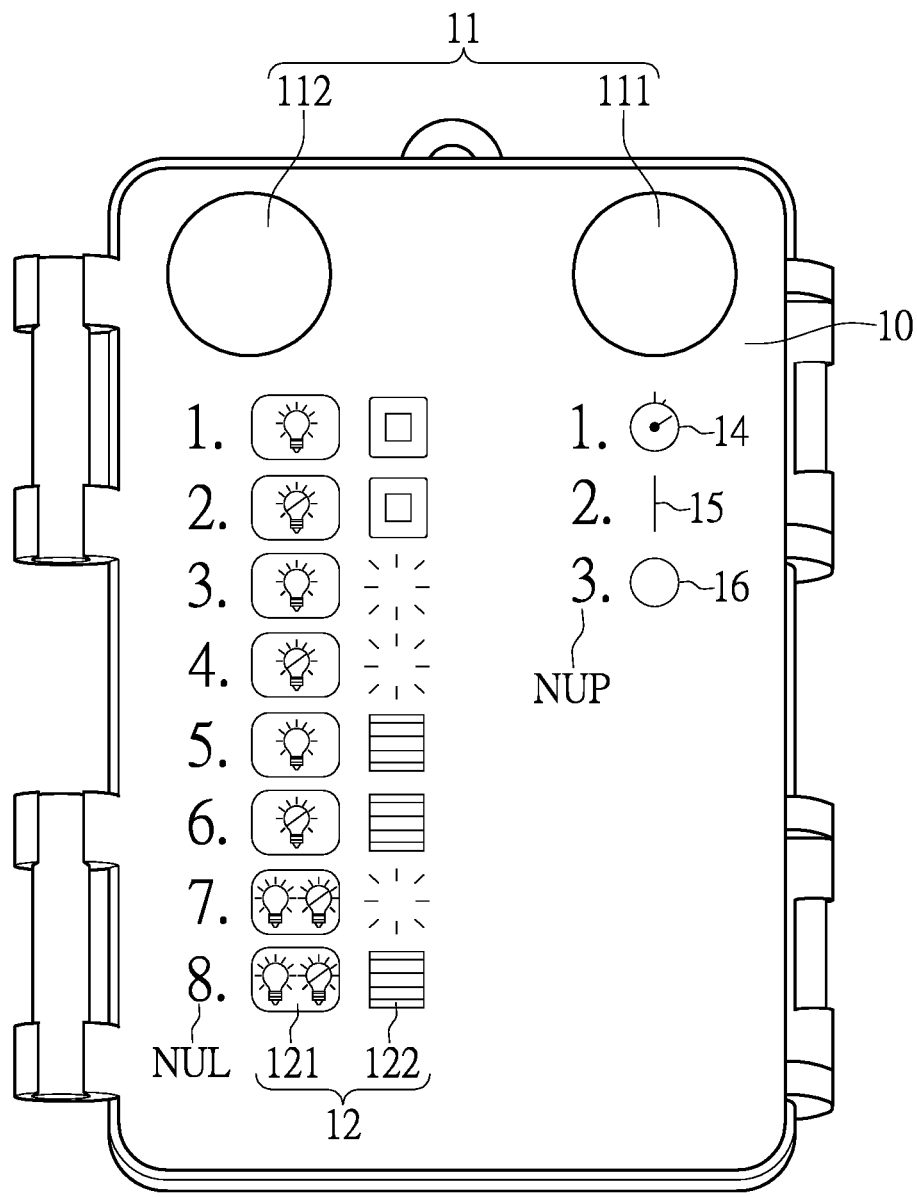
FIG. 1 is a front view of a lighting controller for switching a light string between a plurality of lighting modes according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
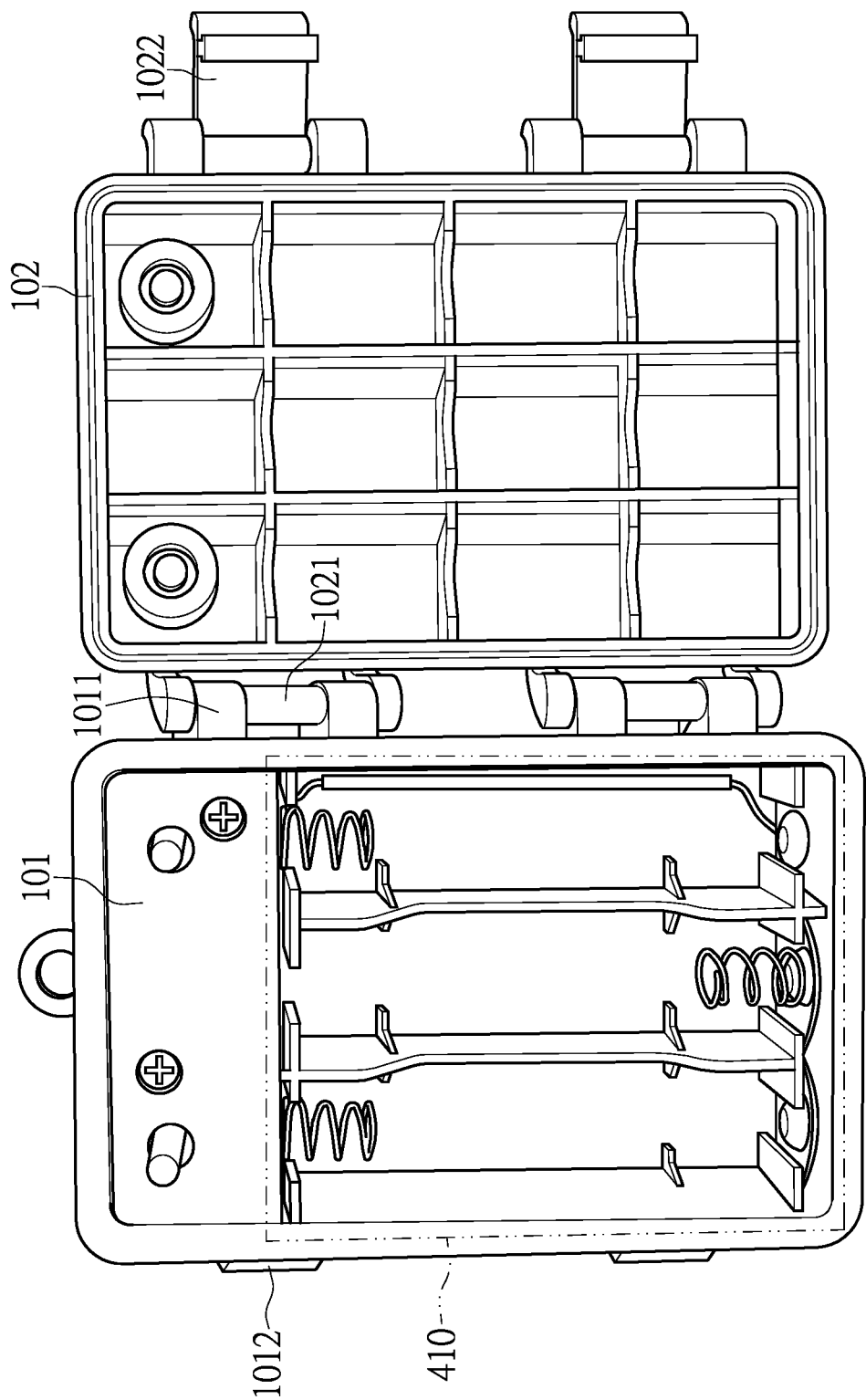
FIG. 2 is a schematic view of an internal structure of the lighting controller for switching the light string between the plurality of lighting modes according to the embodiment of the present disclosure.

Reference is made to FIGS. 1 and 2, wherein FIG. 1 is a front view of a lighting controller for switching a light string between a plurality of lighting modes according to an embodiment of the present disclosure, and FIG. 2 is a schematic view of an internal structure of the lighting controller for switching the light string between the plurality of lighting modes according to the embodiment of the present disclosure. As shown in FIG. 1, in the embodiment, the lighting controller includes a control box 10.

The control box 10 shown in FIG. 1 includes a box body 101 and a cover body 102 as shown in FIG. 2. As shown in FIG. 1, a switching component 11 is disposed on the box body 101 of the control box 10. In the embodiment, the switching component 11 includes a switch button 111 and a mode switching button 112. The switch button 111 and the mode switching button 112 may be two circular buttons, but the present disclosure is not limited thereto. In practice, they may be replaced with other types of buttons. The number and configurations of the switch button 111 and the mode switching button 112 may be adjusted according to actual requirements.

A plurality of sequence numbers are marked on an outer surface of the box body 101 of the control box 10 and includes a first sequence number group NUP. In addition, a turning-on timing pattern 14, a cancel timing pattern 15 and a turning-off pattern 16 are arranged from top to bottom on the outer surface of the box body 101 of the control box 10, and correspond to a plurality of sequence numbers of the first sequence number group NUP. The turning-on timing pattern 14, the cancel timing pattern 15 and the turning-off pattern 16 are located below the switch button 111 adjacent to the right of the first sequence number group NUP. In the embodiment, the first sequence number group NUP represents the number of times that the switch button 111 of the switching component 11 needs to be triggered. The shape, the size, the number and the positions of the patterns on the control box 10 are only exemplified in FIG. 1, and the present disclosure is not limited thereto.

The plurality of sequence numbers further includes a second sequence number group NUL on the outer surface of the box body 101 of the control box 10. In addition, a plurality of lighting patterns 12 are marked on the outer surface of the box body 101 of the control box 10 adjacent to the right of the second sequence number group NUL. The plurality of lighting patterns 12 includes a first lighting pattern group 121 and a second lighting pattern group 122, which are arranged below the mode switching button 112 from top to bottom and correspond to the plurality of sequence numbers of the second sequence number group NUL.

As shown in FIG. 2, the box body 101 of the control box 10 has an open power source accommodation space 410. The power source accommodation space 410 may include a plurality of sub-accommodation spaces, in which a plurality of power supply components such as batteries may be respectively accommodated. For example, in the embodiment, the power source accommodation space 410 of the box body 101 is divided into three sub-accommodation spaces, in which three power supply components such as AA batteries may be respectively accommodated, but the present disclosure is not limited thereto. In practice, the power source accommodation space 410 may only have one sub-accommodation space in which only one power supply component is accommodated.

Figure 4:
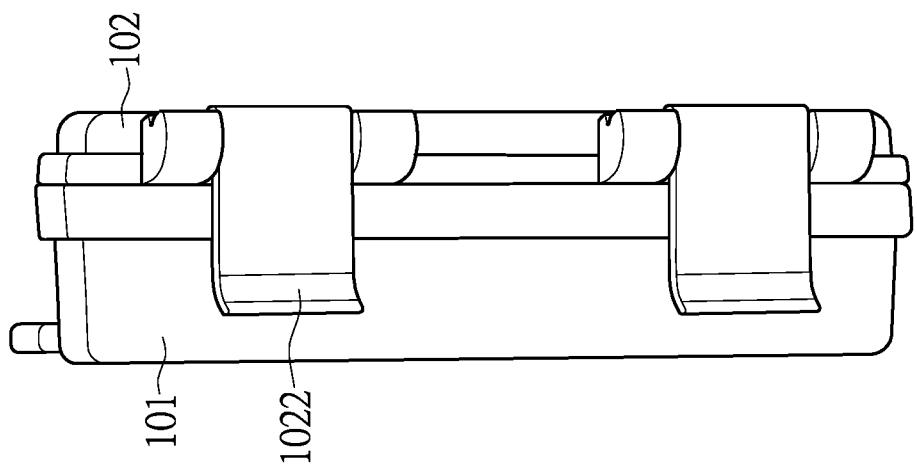
FIG. 4 is a side view of the lighting controller for switching the light string between the plurality of lighting modes according to the embodiment of the present disclosure.
Figure 3:
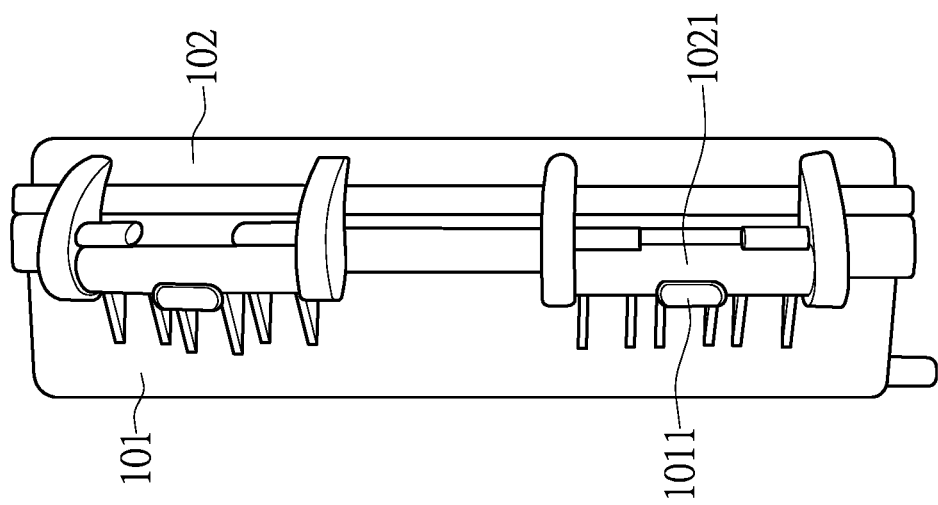
FIG. 3 is a side view of the lighting controller for switching the light string between the plurality of lighting modes according to the embodiment of the present disclosure.

Reference is made to FIGS. 1 to 4, wherein FIG. 3 is a side view of the lighting controller for switching the light string between the plurality of lighting modes according to an embodiment of the present disclosure, and FIG. 4 is another side view of the lighting controller for switching the light string between the plurality of lighting modes according to an embodiment of the present disclosure.

As shown in FIG. 2, the box body 101 of the control box 10 has two first bonding components 1011, and the cover body 102 of the control box 10 has two second bonding components 1021. As shown in FIGS. 2 and 3, the first bonding components 1011 are (removably) bonded to the second bonding components 1021 respectively. Therefore, the cover body 102 shown in FIG. 1 can be rotated at a joint of the first bonding component 1011 and the second bonding component 1021 as a fulcrum to a position to cover the box body 101.

As shown in FIG. 2, the box body 101 of the control box 10 may have two first fastening components 1012 and the cover body 102 may have two second fastening components 1022. As shown in FIGS. 1 and 3, when the box body 101 is covered by the cover body 102, the first fastening components 1012 can be fastened to the second fastening components 1022, respectively. As a result, the box body 101 is more tightly covered by the cover body 102 and the power supply components such as the batteries are sealed in the control box 10, thereby preventing the batteries from falling out of the power source accommodation space 410 of the box body 101.

If the power supply components such as the batteries in the power source accommodation space 410 of the box body 101 need to be replaced, the first fastening components 1012 need to be respectively released from the second fastening components 1022. Then, the cover body 102 can be rotated at the joint of the first bonding component 1011 and the second bonding component 1021 as the fulcrum to a position shown in FIG. 2.

Figure 5:
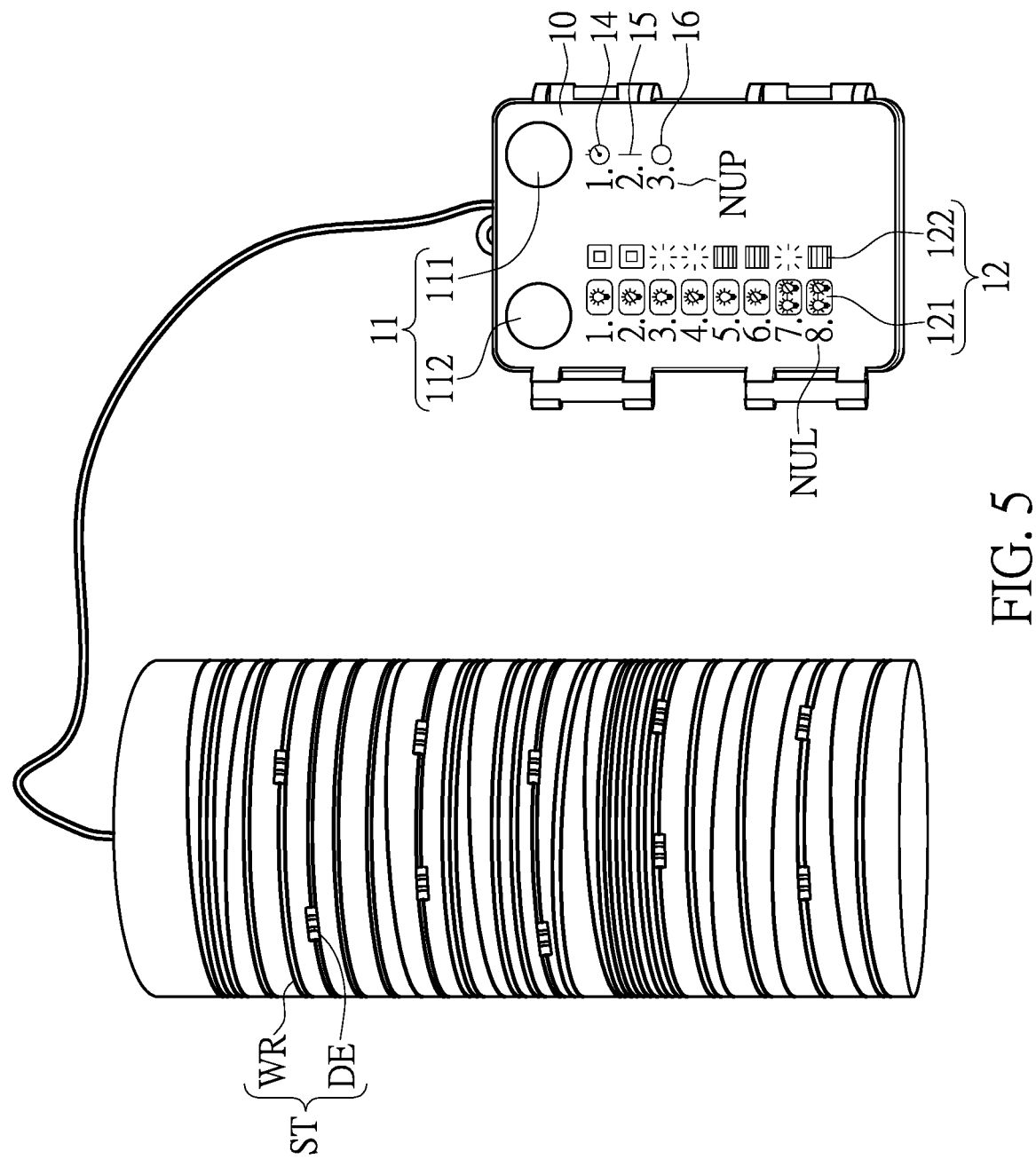
FIG. 5 is a schematic view of a light string assembly having the plurality of lighting modes according to the embodiment of the present disclosure.

Reference is made to FIG. 5, which is a schematic view of a light string assembly having the plurality of lighting modes according to an embodiment of the present disclosure. As shown in FIG. 5, in the embodiment, the light string assembly includes the control box 10 and a light string ST. The control box 10 shown in FIG. 5 is the same as that shown in FIGS. 1 to 4. The same descriptions of the control box 10 are not repeated here.

A switch power source circuit and a lighting control circuit in the control box 10 are connected to the light string ST and used for controlling the light string ST. The light string ST includes a wire WR and light-emitting components DE. For example, the wire WR may be a copper wire, an enameled wire, a Teflon wire, a PVC wire or other suitable wires. The light-emitting components DE are connected to the switch power source circuit and the lighting control circuit through the wire WR.

The light-emitting components DE may be light-emitting diodes or other components each having a function of emitting light. Each light-emitting component DE may have dual chips, a single chip or more chips. It should be understood that the number of light strings controlled by the control box 10, the number of light-emitting components included in each light string, a configuration of each light-emitting component, and a length of each wire may be adjusted according to actual requirements, and the present disclosure is not limited to the examples in the embodiment.

Figure 6:
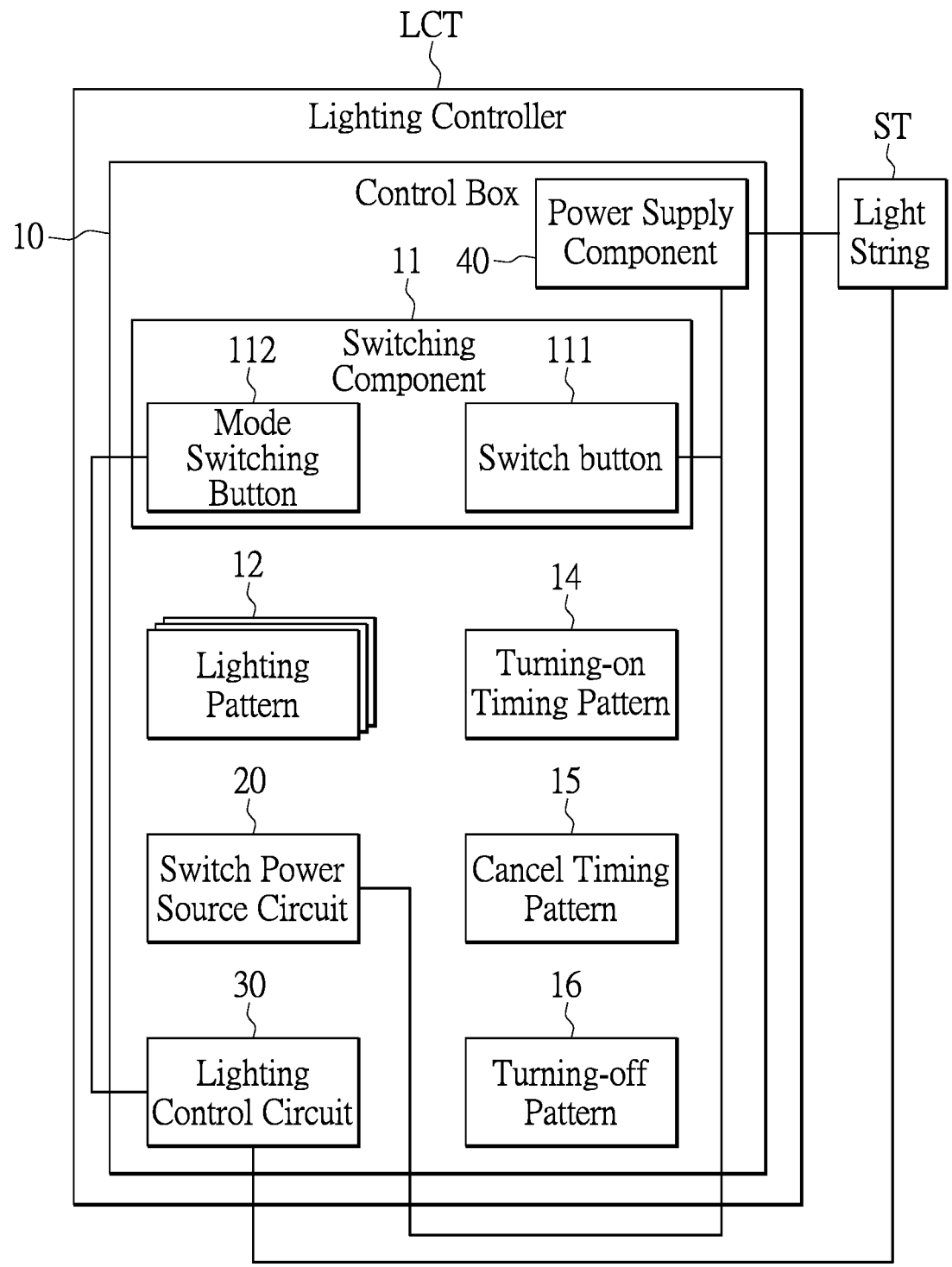
FIG. 6 is a block diagram of the lighting controller for switching the light string between the plurality of lighting modes according to the embodiment of the present disclosure.

Reference is made to FIGS. 2 and 6, wherein FIG. 2 is the schematic view of the internal structure of the lighting controller for switching the light string between the plurality of lighting modes according to the embodiment of the present disclosure and FIG. 6 is a block diagram of the lighting controller for switching the light string between the plurality of lighting modes according to the embodiment of the present disclosure.

As shown in FIG. 6, in the embodiment, a lighting controller LCT includes the control box 10, a switch power source circuit 20 and a lighting control circuit 30. The box body 101 of the control box 10 shown in FIG. 2 may have a closed circuit accommodation space (not shown in the figures), which is located above the power source accommodation space 410. The switch power source circuit 20 and the lighting control circuit 30 as shown in FIG. 6 are accommodated in the circuit accommodation space.

When a power supply component 40 such as a battery is accommodated in the power source accommodation space 410 shown in FIG. 2, the power supply component 40 is electrically contacted with conductive components in the power source accommodation space 410 and connected to the switch power source circuit 20 through the conductive components. For example, the conductive components include positive and negative wires wound in a spiral shape and copper tabs as shown in FIG. 2. As shown in FIG. 6, when the switching component 11 receives a turning-on timing trigger, for example, the switch button 111 is pressed, the switch power source circuit 20 is triggered to turn on and allow the power supply component 40 to supply power to the light string ST.

When the light string ST receives the power, the mode switching button 112 of the switching component 11 is allowed to receive a plurality of lighting triggers. When the mode switching button 112 of the switching component 11 receives the plurality of lighting triggers, for example, the mode switching button 112 is pressed once or multiple times, the lighting control circuit 30 is triggered to switch the light string ST between the plurality of lighting modes according to the number of the lighting triggers received by the mode switching button 112 to control the light string to exhibit a variable lighting effect.

Figure 7:
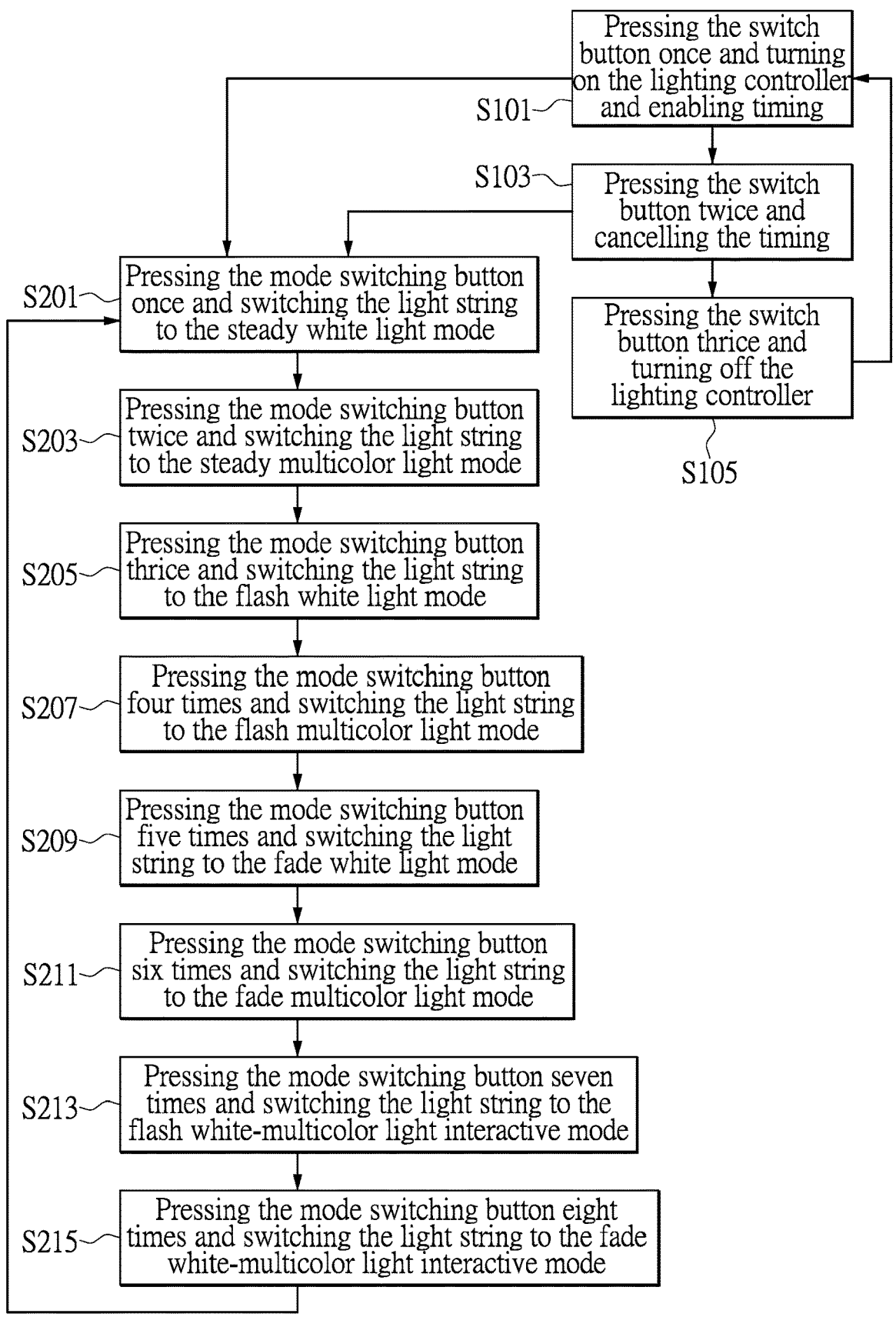
FIG. 7 is a flowchart diagram of a method of switching the light string between the plurality of lighting modes according to the embodiment of the present disclosure.

Reference is made to FIG. 7, which is a flowchart diagram of a method of switching the light string between the plurality of lighting modes according to the embodiment of the present disclosure. As shown in FIG. 7, in the embodiment, the method includes the following steps S101 to S105 and S201 to S215, which may be performed by the lighting controller LCT shown in FIGS. 1 to 6. In practice, the existing steps may be removed or new steps may be added, and an order of performing steps may be adjusted, according to actual application requirements.

The switch button 111 shown in FIGS. 1 and 5 is triggered to turn on the lighting controller LCT, start timing and turn off the lighting controller in the following steps S101 to S105.

In step S101, the switch button 111 shown in FIGS. 1 and 5 is pressed once to make the turning-on timing trigger for triggering the lighting controller LCT to turn on, according to the sequence number "1" in the first sequence number group NUP. The sequence number "1" corresponds to the turning-on timing pattern 14 on the control box 10 shown in FIG. 5. After the lighting controller LCT is turned on, the switch power source circuit 20 allows the power supply component 40 to supply the power to the light string ST and starts timing. After a predetermined time has elapsed from a time point at which the lighting controller LCT is turned on, the lighting controller LCT is turned off automatically.

For example, a first predetermined time is 6 hours and a second predetermined time is 18 hours. For another example, the first predetermined time is 4 hours and the second predetermined time is 20 hours. For another example, the first predetermined time is 8 hours and the second predetermined time is 16 hours. For another example, the first predetermined time is 10 hours and the second predetermined time is 14 hours. The time lengths of the first predetermined time and the second predetermined time are only exemplified in the embodiment, and the present disclosure is not limited thereto. If necessary, in practice, the first predetermined time and the second predetermined time may have different time lengths and be set by a manufacturer or a user according to actual application requirements.

In step S103, the switch button 111 shown in FIGS. 1 and 5 is pressed twice to make a cancel timing trigger to cancel the timing, according to the sequence number "2" in the first sequence number group NUP. The sequence number "2" corresponds to the cancel timing pattern 15 on the control box 10 shown in FIG. 5. The number of times of triggering or pressing the switch button 111 may be accumulated from that in step S101. After the timing is cancelled, the lighting controller LCT is maintained in an on state and operates continuously for 24 hours a day.

After step S101 or S103 are performed, the mode switching button 112 shown in FIG. 1 is pressed to trigger the light string ST to operate in desired lighting modes in steps S201 to S215.

A plurality of lighting modes such as eight modes may be provided in the embodiment. For example, the lighting modes may include a steady white light mode, a steady multicolor light mode, a flash white light mode, a flash multicolor light mode, a fade white light mode, a fade multicolor light mode, a flash white-multicolor light alternating mode, a fade white-multicolor light alternating mode.

In step S105, the switch button 111 shown in FIGS. 1 and 5 is pressed thrice to make a turning-off trigger for triggering the lighting controller LCT to turn off and the power supply component to stop supplying the power to the light string ST, according to the sequence number "3" in the first sequence number group NUP. The sequence number "3" corresponds to the turning-off pattern 16 on the control box 10 shown in FIG. 5. The number of times of triggering or pressing the switch button 111 may be accumulated from that in steps S101 and S103.

The plurality of lighting patterns 12 of the control box 10 shown in FIGS. 1 and 5 includes the first lighting pattern group 121 and the second lighting pattern group 122. The first lighting pattern group 121 includes a plurality of first lighting patterns which respectively correspond to the plurality of lighting modes. Similarly, the second lighting pattern group 122 includes a plurality of second lighting patterns which respectively correspond to the plurality of lighting modes. The light string ST is switched to one of the plurality of lighting modes according to the number of times of triggering the mode switching button 112. The number of times of triggering the mode switching button 112 may be accumulated from that in the previous step.

In step S201, the mode switching button 112 on the control box 10 is pressed once to make a first lighting trigger to the mode switching button 112 to trigger the lighting controller LCT to switch the light string ST to the steady white light mode, according to the sequence number "1" in the second sequence number group NUL on the control box 10 as shown in FIG. 5.

As shown in FIG. 5, the first lighting patterns respectively in the first lighting pattern group 121 and the second lighting pattern group 122 are arranged corresponding to the sequence number "1", and represent that all the light-emitting components DE of the light string ST emit white lights in the steady white light mode during a predetermined time. For example, the light-emitting components DE emit the white lights until the lighting controller LCT is turned off or switches the light string ST to other lighting modes.

In step S203, the mode switching button 112 on the control box 10 is pressed twice to make a second lighting trigger to the mode switching button 112 to trigger the lighting control circuit 30 to switch the light string ST to the steady multicolor light mode, according to the sequence number "2" in the second sequence number group NUL on the control box 10 as shown in FIG. 5.

As shown in FIG. 5, the first lighting patterns respectively in the first lighting pattern group 121 and the second lighting pattern group 122 are arranged corresponding to the sequence number "2", and represent that the light-emitting components DE respectively emit lights having different colors such that the light string ST emits a multicolor light in the steady multicolor light mode.

For example, the first group of light-emitting components DE emit lights having a first color (such as red lights), the second group of light-emitting components DE emit lights having a second color (such as blue lights), the third group of light-emitting components DE emit lights having a third color (such as green lights), and the fourth group of light-emitting components DE emit lights having a fourth color (such as orange lights). The light-emitting components DE may be arranged alternately with each other according to the different colors of the emitted lights in a regular or irregular manner.

In step S205, the mode switching button 112 on the control box 10 is pressed thrice to make a third lighting trigger to the mode switching button 112 to trigger the lighting control circuit 30 to switch the light string ST to the flash white light mode, according to the sequence number "3" in the second sequence number group NUL on the control box 10 as shown in FIG. 5.

The third lighting patterns respectively in the first lighting pattern group 121 and the second lighting pattern group 122 are arranged corresponding to the sequence number "3", and represent that each light-emitting component DE alternatingly emits a white light and a gray light in the flash white light mode. The light-emitting components DE may have the same flashing frequency or different flashing frequencies. In the embodiment, the light-emitting components DE flash every N seconds, wherein N may be any suitable positive value, for example, N=1.5, but the present disclosure is not limited thereto.

Alternatively, all the light-emitting components DE of the light string ST may be divided into M groups, wherein M may be any suitable positive integer value. The different groups of light-emitting components DE have different flashing frequencies. The light-emitting components DE may be grouped according to the colors of the emitted lights, their arrangement positions, or other conditions. For example, the first group of light-emitting components DE emit lights having the first color (such as red lights) at a first predetermined flashing frequency, the second group of light-emitting components DE emit lights having the second color (such as blue lights) at a second predetermined flashing frequency, the third group of light-emitting components DE emit lights having the third color (such as green lights) at a third predetermined flashing frequency, and the fourth group of light-emitting components DE emit lights having the fourth color (such as orange lights) at a fourth predetermined flashing frequency.

In step S207, the mode switching button 112 on the control box 10 is pressed four times to make a fourth lighting trigger to the mode switching button 112 to trigger the lighting control circuit 30 to switch the light string ST to the flash multicolor light mode, according to the sequence number "4" in the second sequence number group NUL on the control box 10 as shown in FIG. 5.

The fourth lighting patterns respectively in the first lighting pattern group 121 and the second lighting pattern group 122 are arranged corresponding to the sequence number "4", and represent that the light string ST emits a flash multicolor light in the flash multicolor light mode. The different groups of light-emitting components DE of the light string ST alternatingly emit multicolor lights and gray lights. The light-emitting components DE may have the same flashing frequency or different flashing frequencies. In the embodiment, the light-emitting components DE flash every N seconds, wherein N may be any suitable positive integer value. The flashing frequency of the light-emitting components DE of the light string ST in the flash multicolor light mode may be the same as or different from that in the flash white light mode.

In step S209, the mode switching button 112 on the control box 10 is pressed five times to make a fifth lighting trigger to the mode switching button 112 to trigger the lighting control circuit 30 to switch the light string ST to the fade white light mode, according to the sequence number "5" in the second sequence number group NUL on the control box 10 as shown in FIG. 5.

The fifth lighting patterns respectively in the first lighting pattern group 121 and the second lighting pattern group 122 are arranged corresponding to the sequence number "5", and represent that each light-emitting component DE slowly and alternatingly emits a white light and a gray light in the fade white light mode, with respect to that in the flash white light mode. For example, each light-emitting component DE emits a white light having an initial white brightness, which gradually decreases to a gray value as time progresses, and changes back to the initial white brightness after a period of time has elapsed, and this process is repeated. The brightness of the white light in the fade white light mode may change at a preset speed, which is smaller than that in the flash white light mode.

In step S211, the mode switching button 112 on the control box 10 is pressed six times to make a sixth lighting trigger to the mode switching button 112 to trigger the lighting control circuit 30 to switch the light string ST to the fade multicolor light mode, according to the sequence number "6" in the second sequence number group NUL on the control box 10 as shown in FIG. 5.

The sixth lighting patterns respectively in the first lighting pattern group 121 and the second lighting pattern group 122 are arranged corresponding to the sequence number "6", and represent that each light-emitting component DE slowly and alternatingly emits a multicolor light and a gray light in the fade multicolor light mode, with respect to that in the flash multicolor light mode. For example, each light-emitting component DE emits a multicolor light having an initial multicolor brightness, which gradually decreases to a gray value as time progresses, and changes back to the initial multicolor brightness after a period of time has elapsed, and this process is repeated. The brightness of the multicolor light in the fade multicolor light mode may change at a preset speed, which is smaller than that of the multicolor light in the flash multicolor light mode and the same as that of the white light in the fade white light mode.

In step S213, the mode switching button 112 on the control box 10 is pressed seven times to make a seventh lighting trigger to the mode switching button 112 to trigger the lighting control circuit 30 to switch the light string ST to the flash white-multicolor light alternating mode, according to the sequence number "7" in the second sequence number group NUL on the control box 10 as shown in FIG. 5.

The seventh lighting patterns respectively in the first lighting pattern group 121 and the second lighting pattern group 122 are arranged corresponding to the sequence number "7", and represent that each light-emitting component DE initially emits a white light for a period of time, then turns to emit a multicolor light for a period of time, then emits a white light for a period of time, and this process is repeated, in the flash white-multicolor light alternating mode.

For example, as shown in FIG. 5, the light string ST has the plurality of light-emitting components DE such as light-emitting diodes, each of which may have a single chip or multiple chips such as dual chips, but the present disclosure is not limited thereto. The multiple chips may emit lights having the same color such as white or multicolor such as blue, red, green and so on. In addition or alternatively, the multiple chips may respectively emit lights having different colors. For example, one chip among the dual chips emits a multicolor light and the other chip among the dual chips emits a white light, or the multiple chips emit lights having different colors from each other. The number of the chips, the colors of the light emitted by the chips and other parameters are only exemplified in the embodiment, and the present disclosure is not limited thereto.

In step S215, the mode switching button 112 on the control box 10 is pressed eight times to make an eighth lighting trigger to the mode switching button 112 to trigger the lighting control circuit 30 to switch the light string ST to the fade white-multicolor light alternating mode, according to the sequence number "8" in the second sequence number group NUL on the control box 10 as shown in FIG. 5.

The eighth lighting patterns respectively in the first lighting pattern group 121 and the second lighting pattern group 122 are arranged corresponding to the sequence number "8", and represent that each light-emitting component DE slowly and alternatively emits a bright light and a gray light in the fade white-multicolor light alternating mode.

For example, the light string ST emits a light, which initially has a first gray value during an initial time, and then gradually changes to a preset white light brightness at a first preset changing rate. Then, the light string ST emits the light having the preset white light brightness during a preset white light maintenance time. Then, the preset white light brightness of the light gradually changes to a second gray value at a second preset changing rate. Then, the light string ST emits the light having the second gray value during a preset gray value maintenance time. Then, the second gray value of the light gradually changes to a preset multicolor light brightness at a third preset changing rate.

After step S215 is performed, steps 201 to S215 are sequentially performed. That is, steps S201 to S215 may be repeated. It should be understood that the number of times of performing each step and the number of times of repeating all steps are only exemplified in the embodiment, and the present disclosure is not limited thereto.

As described above, in the embodiment, the light string ST exhibits different lighting effects in eight lighting modes. An order of performing steps S203 to S215 may be adjusted according to actual requirements. The number of times that the mode switching button 112 needs to be triggered to switch the light string ST to each lighting mode may be adjusted. The lighting effect of the light string ST in each lighting mode may be adjusted. The number of lighting modes may be increased or reduced. Alternatively, after the lighting controller LCT is turned on, the lighting controller LCT switches the light string ST to the steady white light mode without triggering the mode switching button 112 in step S201. The descriptions in the embodiment are only exemplified, and the present disclosure is not limited thereto.

In the embodiment, the number of times of triggering the mode switching button 112 is accumulated under the condition that a time interval between operations of triggering the mode switching button 112 multiple times is not considered. In practice, if necessary, a predetermined time can be set. For example, when the time interval does not exceed the predetermined time, the number of times of triggering the mode switching button 112 is accumulated. For example, when the mode switching button 112 is pressed thrice and the time interval does not exceed the predetermined time, the accumulated number of times of triggering the mode switching button 112 has reached 3 and the light string ST is accordingly switched to the flash white light mode. However, when the mode switching button 112 is pressed thrice, but the time interval exceeds the predetermined time, the number of times of triggering the mode switching button 112 is not accumulated. Under this condition, if the light string is intended to be switched to the flash white light mode, the mode switching button 112 needs to be further pressed thrice.

In the embodiment, when the light string ST currently operates in the flash white light mode, but is intended to be switched to the steady multicolor light mode, the mode switching button 112 must be pressed five times. After the lighting control circuit 30 switches the light string ST to the eighth lighting mode, the mode switching button 112 needs to be further pressed twice to trigger the lighting control circuit 30 to switch the light string ST to the steady multicolor light mode. This process is inconvenient for users. Therefore, in practice, the number of times of triggering the mode switching button 112 is only accumulated for each one of the plurality of lighting modes. For example, when the light string ST currently operates in the flash white light mode and the mode switching button 112 is then pressed twice, the lighting control circuit 30 switches the light string ST to the steady multicolor light mode instead of the fade white light mode.

After the lighting controller LCT is turned off in step S105, the number of times of triggering the mode switching button 112 and the previous lighting effects of the light string ST may be recorded by the lighting control circuit 30 of the lighting controller LCT. When the lighting controller LCT is turned on again, the lighting controller LCT controls the light string ST to exhibit the previous lighting effect, and continually accumulates the number of times of triggering the mode switching button 112 from the previous number and accordingly switches the light string ST to other lighting modes according to the accumulated number. In practice, the lighting controller LCT may reset the number of times of triggering the mode switching button 112 and re-accumulate it each time the lighting controller LCT is turned on.

In summary, the present disclosure provides a lighting controller and method of switching a light string between a plurality of lighting modes, and the light string assembly. The plurality of lighting patterns and the plurality of sequence numbers are marked on the control box of the light string and correspond to the plurality of lighting modes. The sequence numbers instruct the number of times that the switching components such as two buttons on the control box need to be switched. The lighting controller switches the light string between the plurality of lighting modes according to the number of times of triggering the switching components. Therefore, the light string can exhibit the variable lighting effect to provide a better decorative effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting controller for switching a light string between a plurality of lighting modes, comprising:
a control box on which a switching component is disposed;
a switch power source circuit accommodated in the control box, connected to the light string and disposed adjacent to the switching component, wherein when the switching component receives a turning-on timing trigger, the switch power source circuit is triggered to allow a power supply component to supply power to the light string during a predetermined time by the switching component; and
a lighting control circuit accommodated in the control box, connected to the light string and the switch power source circuit, and disposed adjacent to the switching component, wherein when the light string receives the power, the lighting control circuit allows the switching component to receive a plurality of lighting triggers, and when the switching component receives the plurality of lighting triggers, the switching component triggers the lighting control circuit to switch the light string between the plurality of lighting modes according to the plurality of lighting triggers to control the light string to exhibit a variable lighting effect.

2. The lighting controller according to claim 1, wherein the control box has a power source accommodation space in which the power supply component including one or more batteries is accommodated, and the control box has a circuit accommodation space in which the switch power source circuit and the lighting control circuit are accommodated.

3. The lighting controller according to claim 1, wherein the switching component includes a switch button and a mode switching button, the switch button receives the turning-on timing trigger, and the mode switching button receives the plurality of lighting triggers.

4. The lighting controller according to claim 3, wherein when the switch button receives a turning-off trigger, the switch power source circuit stops the power supply component from supplying the power to the light string.

5. The lighting controller according to claim 3, wherein when the switch button receives a cancel timing trigger, the lighting control circuit controls the power supply component to continuously supply the power.

6. The lighting controller according to claim 3, wherein the light string is switched between the plurality of lighting modes depending on the number of times that the mode switching button is triggered.

7. The lighting controller according to claim 3, wherein a plurality of lighting patterns and a plurality of sequence numbers are marked on the control box, the lighting patterns respectively correspond to the sequence numbers, and each of the sequence numbers on the control box is the number of times that the mode switching button needs to be triggered.

8. The lighting controller according to claim 1, wherein the plurality of lighting modes includes a steady white light mode, a steady multicolor light mode, a flashing white light mode, a flash multicolor light mode, a fading white light mode, a fade multicolor light mode, an alternating flash white-multicolor light mode, a fade white-multicolor light alternating mode;

wherein the light string emits a steady white light in the steady white light mode;

wherein the light string emits a steady multicolor light in the steady multicolor light mode;

wherein the light string emits a flash white light in the flash white light mode;

wherein the light string emits a flash multicolor light in the flash multicolor light mode;

wherein the light string initially emits a white light having an initial white brightness, which gradually decreases to a gray value as time progresses and then changes back to the initial white brightness, in the fade white light mode;

wherein the light string initially emits a multicolor light having an initial multicolor brightness, which gradually decreases to a gray value as time progresses and then changes back to the initial multicolor brightness, in the fade multicolor light mode;

wherein the light string alternatingly emits a white light and a multicolor light in the flash white-multicolor light alternating mode; and wherein the light string emits a light, which initially has a first gray value, then gradually changes to a preset white light brightness, then gradually changes to a second gray value, and then gradually changes to a preset multicolor light brightness, in the fade white-multicolor light alternating mode.

9. The lighting controller according to claim 1, wherein a plurality of light-emitting components are disposed in the light string, and each of the light-emitting components has multiple chips that emit lights having the same color or different colors.

10. A light string assembly having a plurality of lighting modes, comprising:

a light string; and a lighting control circuit, including:

a control box on which a switching component is disposed;

a switch power source circuit accommodated in the control box, connected to the light string and disposed adjacent to the switching component, wherein when the switching component receives a turning-on timing trigger, the switch power source circuit is triggered to allow a power supply component to supply power to the light string during a predetermined time by the switching component; and a lighting control circuit accommodated in the control box, connected to the light string and the switch power source circuit, and disposed adjacent to the switching component, wherein when the light string receives the power, the lighting control circuit allows the switching component to receive a plurality of lighting triggers, and when the switching component receives the plurality of lighting triggers, the switching component triggers the lighting control circuit to switch the light string between the plurality of lighting modes according to the plurality of lighting triggers to control the light string to exhibit a variable lighting effect.

11. The light string assembly according to claim 10, wherein the control box has a power source accommodation space in which the power supply component including one or more batteries is accommodated, and the control box has a circuit accommodation space in which the switch power source circuit and the lighting control circuit are accommodated.

12. The light string assembly according to claim 10, wherein the switching component includes a switch button and a mode switching button, the switch button receives the turning-on timing trigger, and the mode switching button receives the plurality of lighting triggers.

13. The light string assembly according to claim 12, wherein when the switch button receives a turning-off trigger, the switch power source circuit stops the power supply component from supplying the power to the light string.

14. The light string assembly according to claim 12, wherein when the switch button receives a cancel timing trigger, the lighting control circuit controls the power supply component to continuously supply the power.

15. The light string assembly according to claim 12, wherein the light string is switched between the plurality of lighting modes according to the number of times that the mode switching button is triggered.

16. The light string assembly according to claim 12, wherein a plurality of lighting patterns and a plurality of sequence numbers are marked on the control box, the lighting patterns respectively correspond to the sequence numbers, and each sequence number represents the number of times that the mode switching button needs to be triggered.

17. The light string assembly according to claim 10, wherein the plurality of lighting modes includes a steady white light mode, a steady multicolor light mode, a flash white light mode, a flash multicolor light mode, a fade white light mode, a fade multicolor light mode, a flash white-multicolor light alternating mode, a fade white-multicolor light alternating mode;

wherein the light string emits a steady white light in the steady white light mode;

wherein the light string emits a steady multicolor light in the steady multicolor light mode;

wherein the light string emits a flash white light in the flash white light mode;

wherein the light string emits a flash multicolor light in the flash multicolor light mode;

wherein the light string initially emits a white light having an initial white brightness, which gradually decreases to a gray value as time progresses and then changes back to the initial white brightness, in the fade white light mode;

wherein the light string initially emits a multicolor light having an initial multicolor brightness, which gradually decreases to a gray value as time progresses and then changes back to the initial multicolor brightness, in the fade multicolor light mode;

wherein the light string alternatingly emits a white light and a multicolor light in the flash white-multicolor light alternating mode; and wherein the light string emits a light, which initially has a first gray value, then gradually changes to a preset white light brightness, then gradually changes to a second gray value, and then gradually changes to a preset multicolor light brightness, in the fade white-multicolor light alternating mode.

18. The light string assembly according to claim 10, wherein a plurality of light-emitting components are disposed in the light string, and each of the light-emitting components has multiple chips, which emit lights having the same color or different colors.

19. A method of switching a light string between a plurality of lighting modes, comprising the following steps:

applying a turning-on timing trigger to a switching component on a control box;

triggering a switch power source circuit to allow a power supply component to supply power to the light string during a predetermined time according to the turning-on timing trigger being received by the switching component;

applying a plurality of lighting triggers to the switching component; and triggering a lighting control circuit to switch the light string between the plurality of lighting modes to control the light string to exhibit a variable lighting effect according to the lighting triggers being received by the switching component.

20. The method according to claim 19, further comprising the following steps:

receiving a turning-off trigger by a switch button of the switching component; and stopping the power supply component supplying the power to the light string according to the turning-off trigger by the switch power source circuit.

21. The method according to claim 19, further comprising the following steps:

receiving a cancel timing trigger by a switch button of the switching component; and controlling the power supply component to continuously supply the power according to the cancel timing trigger by the lighting control circuit.

22. The method according to claim 19, further comprising the following step:

providing a steady white light mode, a steady multicolor light mode, a flash white light mode, a flash multicolor light mode, a fade white light mode, a fade multicolor light mode, a flash white-multicolor light alternating mode and a fade white-multicolor light alternating mode, which are included in the plurality of lighting modes;

wherein the light string emits a steady white light in the steady white light mode;

wherein the light string emits a steady multicolor light in the steady multicolor light mode;

wherein the light string emits a flash white light in the flash white light mode;

wherein the light string emits a flash multicolor light in the flash multicolor light mode;

wherein the light string initially emits a white light having an initial white brightness, which gradually decreases to a gray value as time progresses and then changes back to the initial white brightness, in the fade white light mode;

wherein the light string initially emits a multicolor light having an initial multicolor brightness, which gradually decreases to a gray value as time progresses and then changes back to the initial multicolor brightness, in the fade multicolor light mode;

wherein the light string alternatingly emits a white light and a multicolor light in the flash white-multicolor light alternating mode; and wherein the light string emits a light, which initially has a first gray value, then gradually changes to a preset white light brightness, then gradually changes to a second gray value, and then gradually changes to a preset multicolor light brightness, in the fade white-multicolor light alternating mode.

23. The method according to claim 19, further comprising the following steps:

disposing a plurality of light-emitting components each having multiple chips in the light string; and emitting lights having the same color or different colors by the multiple chips of each of the light-emitting components.

* * * * *